(12) United States Patent
Kotecha

(10) Patent No.: US 10,034,273 B2
(45) Date of Patent: *Jul. 24, 2018

(54) SYSTEM AND METHOD FOR RESOURCE BLOCK-SPECIFIC CONTROL SIGNALING

(71) Applicant: Apple Inc., Cupertino, CA (US)

(72) Inventor: Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,695

(22) Filed: Sep. 22, 2017

(65) Prior Publication Data

US 2018/0014294 A1 Jan. 11, 2018

Related U.S. Application Data

(63) Continuation of application No. 15/163,756, filed on May 25, 2016, now Pat. No. 9,775,139, which is a
(Continued)

(51) Int. Cl.
*H04W 72/04* (2009.01)
*H04L 5/00* (2006.01)
(Continued)

(52) U.S. Cl.
CPC ...... *H04W 72/0406* (2013.01); *H04B 7/0417* (2013.01); *H04L 5/0007* (2013.01);
(Continued)

(58) Field of Classification Search
CPC ............ H04W 72/0406; H04B 7/0417; H04L 5/0007; H04L 5/0037; H04L 5/0094; H04L 27/2601
See application file for complete search history.

(56) References Cited

U.S. PATENT DOCUMENTS 5,909,649 A 6/1999 Saunders
6,473,467 B1 10/2002 Wallace et al.
(Continued)

FOREIGN PATENT DOCUMENTS

EP 1453262 1/2004
KR 1020050041643 5/2005
WO 2007044173 4/2007

OTHER PUBLICATIONS

Love, "Limited Feedback Precoding for Spatial Multiplexing Systems Using Linear Receivers," Military Communications Conference, 2003, MILCOM 2003, IEEE vol. 1, Publication Year 2003, pp. 627-632.
(Continued)

*Primary Examiner* — Melvin Marcelo
(74) *Attorney, Agent, or Firm* — Meyertons, Hood, Kivlin, Kowert & Goetzel, P.C.

(57) ABSTRACT

A system and method is disclosed for resource block-specific control signaling in a communication system. Communication data is transmitted using a transmission channel comprising a plurality of resource blocks defined by allocating time-frequency slots in a transmission resource. Resource block control information is transmitted in a "feed-forward" manner to a user end (UE) or group of UEs using channels physically mapped into scheduled resource blocks (RBs) for that user or group of users. Embodiments of the invention provide an RB-specific control channel that comprises RB control elements that are embedded within scheduled resource blocks. The invention, therefore, reduces the amount of control information that must be transmitted by common or shared control channels.

20 Claims, 6 Drawing Sheets

Related U.S. Application Data continuation of application No. 14/806,754, filed on Jul. 23, 2015, now Pat. No. 9,357,533, which is a continuation of application No. 14/500,894, filed on Sep. 29, 2014, now Pat. No. 9,094,962, which is a continuation of application No. 13/944,176, filed on Jul. 17, 2013, now Pat. No. 9,094,961, which is a continuation of application No. 11/742,204, filed on Apr. 30, 2007, now Pat. No. 8,547,986.

(51) Int. Cl.
H04L 27/26 (2006.01)
H04B 7/0417 (2017.01)

(52) U.S. Cl.
CPC .......... *H04L 5/0037* (2013.01); *H04L 5/0094* (2013.01); *H04L 27/2601* (2013.01)

(56) References Cited

U.S. PATENT DOCUMENTS

| | | | |
|---|---|---|---|
| 6,968,092 B1 | 11/2005 | Winger | |
| 7,016,319 B2 | 3/2006 | Baum et al. | |
| 7,110,463 B2 | 9/2006 | Wallace et al. | |
| 7,139,328 B2 | 11/2006 | Thomas et al. | |
| 7,151,809 B2 | 12/2006 | Ketchum et al. | |
| 7,164,649 B2 | 1/2007 | Walton et al. | |
| 7,505,527 B2 | 3/2009 | Hwang et al. | |
| 7,602,837 B2 | 10/2009 | Kotecha et al. | |
| 7,751,368 B2 | 7/2010 | Li et al. | |
| 7,809,074 B2 | 10/2010 | Kotecha et al. | |
| 2004/0066761 A1 | 4/2004 | Giannakis et al. | |
| 2004/0076224 A1 | 4/2004 | Onggosanusi et al. | |
| 2004/0108944 A1 | 6/2004 | Lee et al. | |
| 2004/0190482 A1 | 9/2004 | Baum et al. | |
| 2004/0228423 A1 | 11/2004 | Gueguen | |
| 2005/0009476 A1 | 1/2005 | Wu et al. | |
| 2005/0043031 A1 | 2/2005 | Cho et al. | |
| 2005/0063331 A1 | 3/2005 | Kim et al. | |
| 2005/0101259 A1 | 5/2005 | Tong et al. | |
| 2005/0117660 A1 | 6/2005 | Vialle et al. | |
| 2005/0129137 A1 | 6/2005 | Yamada et al. | |
| 2005/0135324 A1 | 6/2005 | Kim et al. | |
| 2005/0181739 A1 | 8/2005 | Krasny et al. | |
| 2005/0201296 A1 | 9/2005 | Vannithamby et al. | |
| 2005/0276317 A1 | 12/2005 | Jeong et al. | |
| 2006/0072677 A1 | 4/2006 | Kwak et al. | |
| 2006/0092054 A1 | 5/2006 | Li et al. | |
| 2006/0093065 A1 | 5/2006 | Thomas et al. | |
| 2006/0098760 A1 | 5/2006 | Shen et al. | |
| 2006/0111100 A1 | 5/2006 | Murata et al. | |
| 2006/0120478 A1 | 6/2006 | Kim et al. | |
| 2006/0121946 A1 | 6/2006 | Walton et al. | |
| 2006/0155534 A1 | 7/2006 | Lin et al. | |
| 2006/0155798 A1 | 7/2006 | Ketchum et al. | |
| 2006/0209980 A1 | 9/2006 | Kim et al. | |
| 2006/0239377 A1 | 10/2006 | McCoy et al. | |
| 2006/0279460 A1 | 12/2006 | Yun et al. | |
| 2007/0010268 A1 | 1/2007 | Kim et al. | |
| 2007/0024780 A1 | 2/2007 | Kim et al. | |
| 2007/0026808 A1 | 2/2007 | Love et al. | |
| 2007/0064665 A1 | 3/2007 | Zhang et al. | |
| 2007/0066571 A1 | 3/2007 | Stockel et al. | |
| 2007/0070967 A1 | 3/2007 | Yang et al. | |
| 2007/0071147 A1 | 3/2007 | Sampath et al. | |
| 2007/0086540 A1 | 4/2007 | Chae et al. | |
| 2007/0098106 A1 | 5/2007 | Khojastepour et al. | |
| 2007/0099571 A1 | 5/2007 | Withers, Jr. et al. | |
| 2007/0121543 A1 | 5/2007 | Kuchibhotla et al. | |
| 2007/0127608 A1 | 6/2007 | Scheim et al. | |
| 2007/0147535 A1 | 6/2007 | Niu et al. | |
| 2007/0165731 A1 | 7/2007 | Xiao et al. | |
| 2007/0191066 A1 | 8/2007 | Khojastepour et al. | |
| 2007/0195974 A1 | 8/2007 | Li et al. | |
| 2007/0206545 A1 | 9/2007 | Lee et al. | |
| 2007/0211813 A1 | 9/2007 | Talwar et al. |
| 2007/0223619 A1 | 9/2007 | Lee et al. |
| 2007/0249296 A1 | 10/2007 | Howard et al. |
| 2007/0258392 A1 | 11/2007 | Larsson et al. |
| 2007/0297528 A1 | 12/2007 | Feder et al. |
| 2008/0013610 A1 | 1/2008 | Varadarajan et al. |
| 2008/0056414 A1 | 3/2008 | Kim et al. |
| 2008/0075058 A1 | 3/2008 | Mundarath et al. |
| 2008/0076370 A1 | 3/2008 | Kotecha et al. |
| 2008/0080449 A1 | 4/2008 | Huang et al. |
| 2008/0080459 A1 | 4/2008 | Kotecha et al. |
| 2008/0102846 A1 | 5/2008 | Kim et al. |
| 2008/0118008 A1 | 5/2008 | Kim et al. |
| 2008/0159425 A1 | 7/2008 | Khojastepour et al. |
| 2008/0165875 A1 | 7/2008 | Mundarath et al. |
| 2008/0187062 A1 | 8/2008 | Pan et al. |
| 2008/0212701 A1 | 9/2008 | Pan et al. |
| 2008/0212702 A1 | 9/2008 | Pan et al. |
| 2008/0227495 A1 | 9/2008 | Kotecha et al. |
| 2008/0229177 A1 | 9/2008 | Kotecha |
| 2009/0104901 A1 | 4/2009 | Baker et al. |
| 2009/0190688 A1 | 7/2009 | Kotecha et al. |
| 2010/0202553 A1 | 8/2010 | Kotecha et al. |

OTHER PUBLICATIONS

Love, "Limited Feedback Unitary Preceding for Orthogonal SpaceTime Block Codes," IEEE Transactions on Signal Processing, Publication date Jan. 2005, vol. 53, Issue 1, pp. 64-73.

Castro et al., "Adaptive Vector Quantization for Precoding Using Blind Channel Prediction in Frequency Selective MIMO Mobile Channels."

A. Jette et al., "IEEE 802.20 Working Group on Mobile Broadband Wireless Access," Technical Overview Presentation, Motorola, Jul. 20, 2001.

Soo-Toung Jeon et al., Channel Adaptive CQI Reporting Schemes for UMTS High-Speed Downlink Packet Access; In: Vehicular Technology Conference, 2006, VTS—2006 Fall, IEEE 64th, Sep. 2006, pp. 1-5.

A. Bourdoux et al., "Joint TX-RX Optimisation for MIMO-SDMA Based on a Null-space Constraint," IEEE Vehicular Technology Conference, vol. 1, 2002.

K. Wong et al, "Performance Enhancement of Multiuser MIMO Wireless Communication Systems," IEEE Transactions on Communications, vol. 50, No. 12, Dec. 2002.

S.V. Bana et al., "Space Division Multiple Access (SDMA) for Robust Ad hoc Vehicle Communication Networks," The IEEE Fourth International Conference on Intelligent Transportation Systems, 2001 IEEE Intelligent Transportation Systems.

D.J. Love et al, "Grassmannian Beamforming on Correlated MIMO Channels," IEEE Global Telecommunications conference, Nov. 3-Dec. 3, 2004.

D.J. Love et al., "Grassmannian Beamforming for Multiple-Input Multiple-Output Wireless Systems," IEEE, 2003.

A.F. Naguib et al., Performance of Wireless CDMA with M-ary Orthogonal Modulation and Cell Site Antenna Arrays, IEEE, Journal on Selected Areas in Communications, vol. 14, No. 9, Dec. 1996.

L. Dong et al., "Opportunistic Transmission Scheduling for Multiuser MIMO Systems," IEEE, 2003.

H. Shin et al., "Closed-form Formulas for Ergodic Capacity of MIMO Rayleigh Fading Channels," IEEE, 2003.

M. Torlak et al., "Fast Estimation of Weight Vectors to Optimize Multi-Transmitter Broadcast Channel Capacity," IEEE Transactions on Signal Processing, vol. 46, No. 1, Jan. 1998.

V. Zaharov et al., "Smart Antenna Application for Satellite Communication Systems with Space Division Multiple Access," Journal of Radio Electronics, N. 2, Feb. 5, 2001, printed Oct. 18, 2005.

M. Cooper et al., "Intelligent Antennas: Spatial Division Multiple Access," 1996 Annual Review of Communications.

G.J. Foschini et al., On Limits of Wireless Communication in a Fading Environment when Using Multiple Antennas, Wireless Personal Communications, vol. 6, 1998, pp. 311-335, http://www1.belllabs.com/project/blast/wpc-v6n3.pdf.

(56) References Cited

OTHER PUBLICATIONS

R. Monzingo et al, Introduction to Adaptive Arrays, Chapter 3, John Wiley & Sons, 1980, pp. 78-151.
International Search Report and Written Opinion correlating to PCT/US2008/061704, dated Oct. 15, 2008.
International Search Report and Written Opinion for PCT Patent Application No. PCT/US2008/061218 dated Aug. 14, 2008.
Soo-Toung Jeon et al., An Enhanced Channel-Quality (CQI) Reporting Scheme for HSDPA Systems, In: Communications Letters, IEEE May 2005, vol. 9, pp. 432-434.
D. Love, "Limited Feedback Unitary Precoding for Spatial Multiplexing Systems," IEEE Transactions on Information Theory, vol. 51, No. 8, Aug. 2005.
A. Goldsmith, "The Capacity of Downlink Fading Channels with Variable Rate and Power," IEEE Transactions on Vehicular Technology, vol. 46, No. 3, Aug. 1997.
Analysis on DCT based CQi Reporting Scheme, 3GPP TSG RAN WG1 #46-bis, R1-062954, Seoul, Republic of Korea, Oct. 9-13, 2006.
International Search Report and Written Opinion for PCT Patent Application No. PCT/US2008/056579 dated Jul. 31, 2008.
Soo-Yong Jeon et al., Channel Adaptive CQi Reporting Schemes for HSDPA Systems, Communications Letter, IEEE, vol. 10, Issue 6, Jun. 2006, pp. 459-461.
K. Huang et al., "Effect of Feedback Delay on Limited Feedback for Temporally Correlated Channels," Jul. 2006.
Google Search, CQi First Second Subset Channel, Aug. 3, 2010.
Yi, "Beamforming for MIMO systems with limited feedback," 2006 IET International Conference on Wireless. Mobile and Multimedia Networks, Nov. 6-9, 2006 pp. 1-3.
PCT International Search Report and Written Opinion related to PCT/US2008/054355 dated Jun. 27, 2008.
Mondal, "Frame theoretic quantization for limited feedback MIMO beamforming systems" 2005 International 3 Conference on Wireless Networks, Communications and Mobile Computing, vol. 2, Jun. 13-16, 2005 pp. 1065-1070 vol. 2.
Freescale, "Overview and Way forward on MIMO Precoding in DL EUTRA," R1-070220 Jan. 2006 3GPP TGS RAN WG1 Meeting #47bis, Sorrento, Italy.
Philips, "Comparison between MU-MIMO codebook-based channel reporting techniques for LTE downlink," R1-062483, Oct. 2006. 3GPP TGS RAN WG1 Meeting #46bis, Seoul.
Philips, "System-level simulation results for channel vector quantisation feedback for MU-MIMO," R1-063028, Nov. 2006. 3GPP, TGS RAN WGI Meeting #47, Riga.
Philips, "Comparison of MU-MIMO Feedback Schemes with Multiple UW Receive Antennas," 3GG TSG RAN WG1 Meeting #47bis, Sorrento, Italy, Jan. 15-19, 2007, Tdoc R1-070346.
Alcatel, "Link-level results for multiuser eigenmode transmission with limited feedback;" R1-070318 3GG TSG RAN WG1Meeting #47bis, Sorrento, Italy, Jan. 15-19, 2007, Tdoc R1-070318.
Alcatel-Lucent, Philips, "Dedicated Reference Signals for MU-MIMO Precoding in E-UTRA Downlink," TSG-RAN WG1 #48, St. Louis, Missouri, Feb. 12-16, 2007, R1-071069.
Freescale, "Scheme for MU-MIMO in DL EUTRA," R1-070608 (this is an update of R1-070223 and in the document the number was R1-070223. The Examiner changed to 608), Jan. 2007, 3GPP TGS RAN WG1 Meeting #47bis, Sorrento, Italy.
Freescale, Efficient method for feedback reduction and feedback mechanism for precoded MIMO in EUTRA R1-070221 Jan. 2006 3GPP TGS RAN WG1 Meeting #47bis, Sorrento, Italy.
Freescale. "Aspects of SU/MU Switching and MU-MIMO in DL EUTRA," R1-070222 Jan. 2006 3GPP TGS RAN WG1 Meeting #47bis, Sorrento, Italy.
Freescale, "Scheme for MU-MIMO in DL EUTRA," R1-070223 Jan. 2006 3GPP TGS RAN WG1 Meeting #47bis, Sorrento, Italy.

K. Huang et al., "Joint Beamforming and Scheduling for SDMA Systems with Limited Feedback," Jun. 2006.
K. Huang et al., "Limited Feedback for Temporally-Correlated Channels-Feedback Rate and Delay," Mar. or Jun. 2006.
K. Huang et al., "Markov models for multi-antenna limited feedback systems," Jun. 2006.
K. Huang et al., "Multi-Antenna Limited Feedback for TemporallyCorrelated Channels Feedback Compression," Jul. 2006.
Huang, "Multi-antenna Limited Feedback for Temporally-Correlated Channels: Feedback compression," in Proc. IEEE Global Telecommunication Conference, Nov. 2006.
Rohde & Schwarz, "UMTS Long Term Evolution (L TE Technology Introduction," http://www.rohde-schwarz.com/www/downcent. nsf/ANFileByANNoForInternet/
29605894CA22COA7C125729E003B5BF6/$fiprinted Apr. 30, 2007.
A. Jetie et al., "IEEE 802.20 Working Group on Mobile Broadband Wireless Access," Technical Overview Presentation, Motorola, 7/20/013.
I. Wong et al., "Optimal Resource Allocation in Uplink SC-FDMA Systems," IEEE Transactions on Wireless Communications, http://users.ece.utexas.eduHwong/SCFDMA.htm, Dec. 7, 2006.
"Data-non-associated L 1/L2 Control Channel Structure for E-UTRA Uplink," 3GPP TSG RAN WG1 Meeting #46bis, R1-062741, Seoul, Korea Oct. 9-13, 2006.
N. Jindal,"Finite Rate Feedback MIMO Broadcast Channels," Feb. 2006 ita.ucsd.edu/workshop/06/talks/papers/79.pdf.
D. Love et al., "Feedback Methods for Multiple-Input MultipleOutput Wireless Systems," 2004.
P. Chow, "A Practical Discrete Multi tone Transceiver Loading Algorithm for Data Transmission over Spectrally Shaped Channels," IEEE Transactions on Communications, vol. 43, No. 21314, Feb./Mar./Apr. 1995.
P. Xia et al., "Multi antenna Adaptive Modulation with Beamforming Based on Bandwidth-Constrained Feedback," IEEE Transactions on Communications, vol. 53, No. 3, Mar. 2005.
B. Clerckx, "Space-Time Signaling for Real-World MIMO Channels," Sep. 2005.
R. F.H. Fischer et al., "A New Loading Algorithm for Discrete Multitone Transmission," IEEE 1996.
A. Goldsmith et al., "Variable-Rate Variable-Power MQAM for Fading Channels," IEEE Transactions on Communications, vol. 45, No. 10, Oct. 1997.
A. Goldsmith et al., "Adaptive Coded Modulation for Fading Channels," IEEE Transactions on Communications, vol. 46, No. 5, May 1998.
Z. Hong et al., "Spatial Multiplexing in Correlated Fading via the Virtual Channel Representation," IEEE Journal on Selected Areas in Communications, Jun. 2003.
N. Khajehnouri et al., "A Minimum Co-User Interference Approach for Multi-User MIMO Downlink Precoding," ICASSP 2006.
M. Vu et al., "MIMO Wireless Precoding," www.stanford.edu/-mhv/SPM_MIMO_Wireless_Precoding.pdf.
Kim et al., U.S. Appl. No. 60/841,246, filed Aug. 31, 2006.
B. Hassibi, "An Efficient Square-Root Algorithm for Blast," Proceedings of the 2000 IEEE International Conference on Acoustics, Speech and Signal Processing, Jan. 27, 2000.
B. Banister et al., "A Simple Gradient Sign Algorithm for Transmit Antenna Weight Adaptation with Feedback," IEEE Transactions on Signal Processing, vol. 51, No. 5, May 2003.
J.C. Roh et al., "An Efficient Feedback Method for MIMO Systems with Slowly Time-Varying Channels," IEEE Communications Society, WCNC 2004.
N. Wei et al., Tackling MIMO-OFDMA Feedback Load Through Feedback Encoding, Sep. 6-8, 2009, IEEE Explore, pp. 363-367.
Love, "Limited Feedback Preceding for Spatial Multiplexing Systems," Global Telecommunications Conference, 2003, GLOBECOM '03, IEEE vol. 4, Publication year 2003, pp. 1857-1861.

SYSTEM AND METHOD FOR RESOURCE BLOCK-SPECIFIC CONTROL SIGNALING

PRIORITY CLAIM

This application is a continuation of U.S. patent application Ser. No. 15/163,756, entitled "System and Method for Resource Block-Specific Control Signaling", filed May 25, 2016, which is a continuation of U.S. patent application Ser. No. 14/806,754, of the same title, filed Jul. 23, 2015, now U.S. Pat. No. 9,357,533, which is a continuation of U.S. patent application Ser. No. 14/500,894, of the same title, filed Sep. 29, 2014, now U.S. Pat. No. 9,094,962, which is a continuation of U.S. patent application Ser. No. 13/944,176, of the same title, filed Jul. 17, 2013, now U.S. Pat. No. 9,094,961, which is a continuation of U.S. patent application Ser. No. 11/742,204, of the same title, filed Apr. 30, 2007, now U.S. Pat. No. 8,547,986, all of which are fully incorporated herein by reference for all purposes to the extent not inconsistent with this application.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

BACKGROUND

Field of the Application

The present invention is directed in general to the field of information processing. In one aspect, the present invention relates to a system and method for providing resource block-specific control signaling in a communication system.

Background of the Disclosure

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed.

FIG. 1 depicts a wireless communication system 100 in which a transmitter 102 having a single antenna or an array of antennas 106 communicates with receiver 104 having a single antenna or an array of antennas 108. The communication system 100 may be any type of wireless communication system including, but not limited to, a Multiple Input, Multiple Output (MIMO) system, a Space Division Multiple Access (SDMA) system, a Code Division Multiple Access (CDMA) system, an Orthogonal Frequency Division Multiplexing (OFDM) system, or an Orthogonal Frequency Division Multiple Access (OFDMA) system. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. Of course, the receiver/subscriber station 104 can also transmit signals which are received by the transmitter/base station 102. The signals communicated between transmitter 102 and receiver 104 can include voice, data, electronic mail, video, and other data, voice, and video signals. In operation, the transmitter 102 transmits a signal data stream (e.g., signal $s_1$) through one or more antennas 106 and over a channel $H_1$ to a receiver 104, which combines the received signal from one or more receive antennas 108 to reconstruct the transmitted data. To transmit the signal vector $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$, and is received at the receiver 104 as a receive signal vector $y_1=H_1x_1+n_1$ (where n represents co-channel interference or noise). The channel matrix $H_1$ represents a channel gain between the transmitter antenna array 106 and the subscriber station antenna array 108. Thus, the channel matrix $H_1$ can be represented by a k×N matrix of complex coefficients, where N is the number of antennas in the transmitter/base station antenna array 106 and k is the number of antennas in the receiver/subscriber station antenna array 108. The value of k can be unique for each receiver/subscriber station. As will be appreciated, the channel matrix $H_1$ can instead be represented by a N×k matrix of complex coefficients, in which case the matrix manipulation algorithms are adjusted accordingly so that, for example, the right singular vector calculation on a k×N channel matrix becomes a left singular vector calculation on a N×k channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver is reciprocal in both directions, the actual channel matrix $H_1$ is known to the receiver and may be known to the transmitter.

Current efforts to develop communication systems based on the Third Generation Partnership Project (3GPP) Long-Term Evolution (LTE) standard provide various mechanisms for transmitting "feed-forward" control information for transmission of data over an allocated time-frequency slot of a predetermined portion of a transmission resource in a frequency band. This time-frequency slot of the transmission resource is often referred to as a "resource block" (RB). In current LTE implementations, feed-forward control information to a user end (UE) or a group of UEs is based on the use of common control channels or shared control channels to provide, among other things, information regarding the mapping of a user or users to a resource block in an allocated physical resource. (As used herein, "common/shared control channel" will be used to refer to either a common control channel or a shared control channel.) The common/shared control channel is also used to transmit control information that is specific to various resource blocks. For example, the common/shared control channel may be used to provide modulation coding information, layering information, transmission rank information or preceding matrix information, etc. In general, current implementations of common/shared control channels are inefficient because resource block-specific information is fed forward in the common/shared control channel with a large number of overhead bits being required to indicate the resource block index and the related control information. As will be understood by those of skill in the art, as the number of bits in the common/shared control channel element increases, there is a decrease in the number of users that can be serviced. This inefficiency is exacerbated in multiple-input multiple-output (MIMO) communication systems because redundant information is embedded in the common/shared control channel elements for multiple users.

Accordingly, there is a need for a feed-forward control mechanism that provides control information whereby resource block-specific information is fed forward more efficiently. Specifically, it would be advantageous to provide a system and method whereby only targeted users scan the given scheduled resource block or physical channel in a non-blind manner to utilize a resource block. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
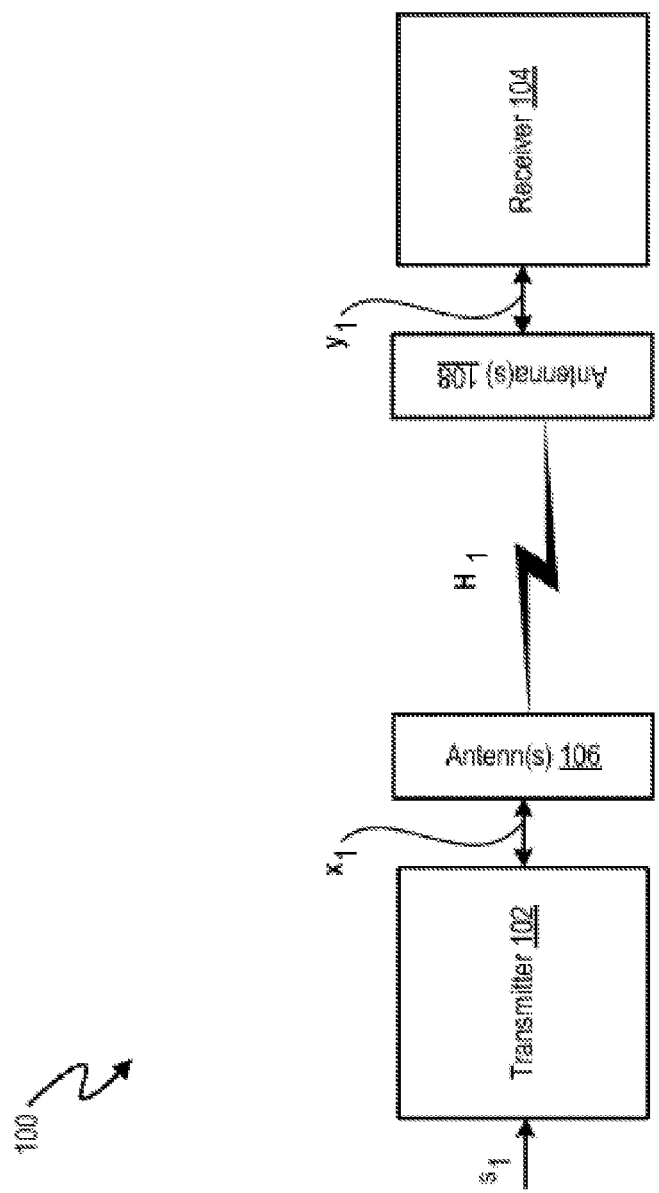
FIG. 1 (labeled prior art) depicts a wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A system and methodology are disclosed for providing resource block (RB)-specific control information to a user end (UE) or a group of UEs. The embodiments of the invention disclosed herein can be implemented in single antenna communication systems or in communication systems wherein the transmitter and/or the receiver comprise multiple antennas. This invention provides a mechanism for transmitting "feed forward" control information to a user end (UE) or group of UEs using channels physically mapped into a scheduled resource block (RB) for that user or group of users. More specifically, the present invention defines an RB-specific control channel that is physically mapped into an allocated physical resource. Thus the RB-specific control channel is embedded within the scheduled resource block. The control information that the RB-specific control channel carries comprises RB-specific control information.

In the present invention, this RB-specific control channel is used to reduce the data overhead of a common-control channel or shared-control channel used in current systems. In current systems, RB-specific control information is fed forward in the common/shared control channel, thereby increasing the size of the data that must be transmitted in the common/shared control channel. Additional transmission overhead may be added for data bits that are required to indicate the resource block index. The system and method of the present invention reduces the amount of RB-specific information transmitted in the common/shared control channel and, therefore, allows more UEs to be allocated in the common/shared control channel. In communication systems where multiple UEs are assigned or scheduled for the same resource in a MIMO communication system, all of the UEs can read this RB-specific control information and save bandwidth compared to a system wherein this signaling information is embedded in a common control channel.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 2:
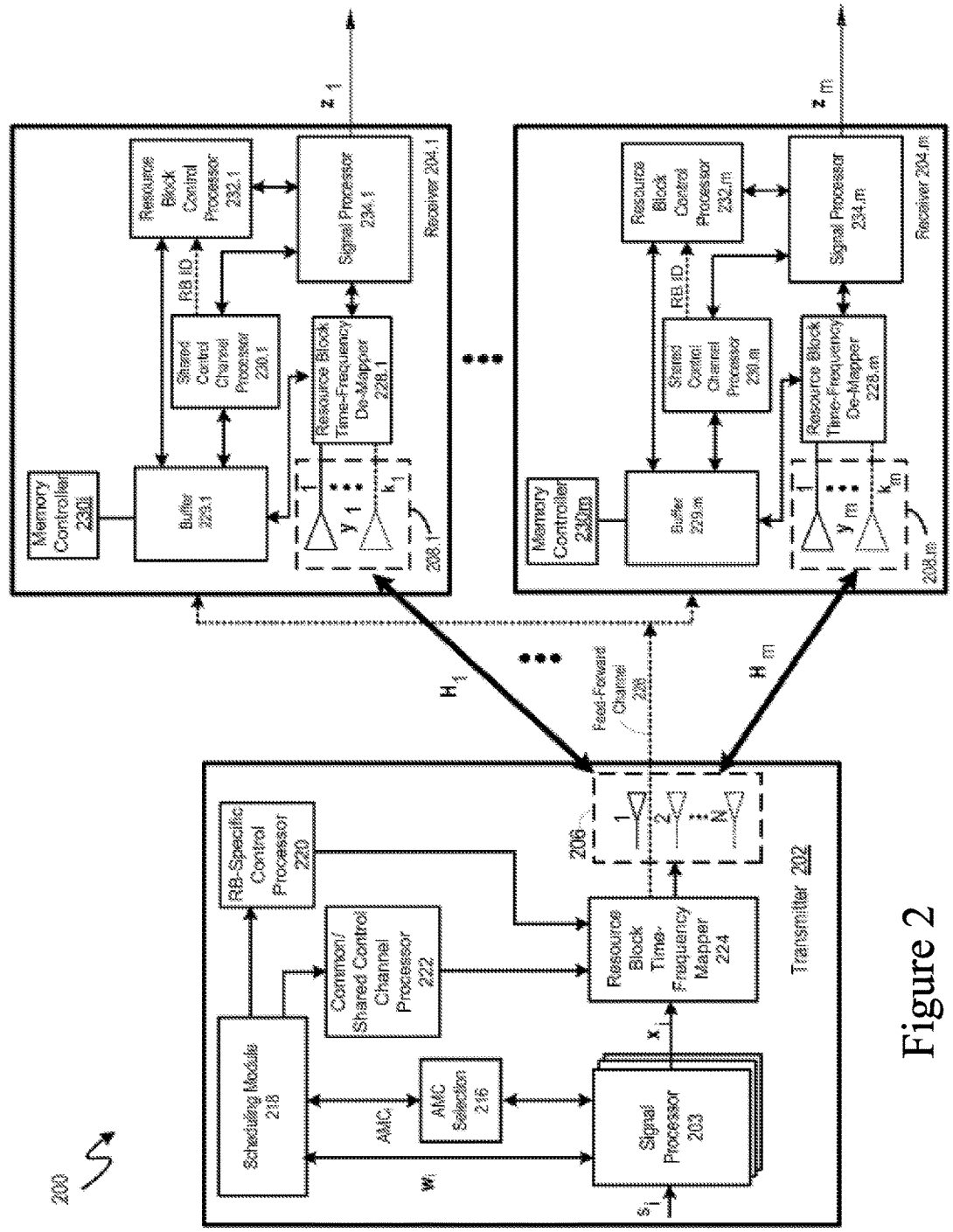
FIG. 2 depicts a wireless communication system in which resource block control information is provided to a plurality of UEs via a feed-forward channel.

FIG. 2 depicts a wireless communication system 200 in which a transmitter 202 uses the resource block control techniques described herein to configure or adapt one or more input signals that are transmitted from a transmitter 202 (e.g., a base station) to one or more receivers 204.1-204.m (e.g., subscriber stations). The transmitter 202 includes a single antenna or an array of antennas 206 for communicating with the receivers 204.1-m. The receivers 204.1-m, may comprise a single antenna or an array of antennas 208.i for communicating with the transmitter 202. In operation, a data signal $s_i$ presented at the transmitter 202 for transmission to the receiver 204.i is transformed by the signal processor 203.i into a transmission signal represented by the vector $x_i$. The signals transmitted from the transmit antenna 206 propagate through a matrix channel $H_i$ and are received by the receive antennas 208.$i$ where they are represented by the vector $y_i$. For a channel from the transmitter 202 to the $i^{th}$ receiver 204.$i$, the channel is denoted by $H_i$, i∈{1, 2, ..., m}. The channel matrix $H_i$ may be represented as a $k_i \times N$ matrix of complex entries representing the complex coefficients of the transmission channel between each transmit-receive antenna pair, where N represents the number of antennas of the transmitter 202 and $k_i$ represents the number of antennas of the $i^{th}$ receiver 204.$i$. At the receiver 204.$i$, the signal processing unit 210.$i$ processes the $y_i$ signals received on the k antennas to obtain a data signal, $z_i$, which is an estimate of the transmitted data $s_i$.

The channel matrix $H_i$ specifies the transmission channel between a transmitter and an $i^{th}$ receiver. For example, in a MIMO implementation, each receiver 204.$l$-$m$ determines its MIMO channel matrix $H_i$ by using pilot estimation or sounding techniques to determine or estimate the coefficients of the channel matrix $H_i$.

In embodiments of the present invention, data is transmitted via the matrix using a plurality of resource blocks (RBs) that represent the allocation of time-frequency transmission resources within a predetermined frequency band. In various embodiments of the invention, the RBs are used to transmit data symbols, common/shared control channel information, and RB-specific control information. The resource blocks are generated by the signal processor 203, the Adaptive Modulation Coding (AMC) selection module 216, and the scheduling module 218, using techniques known to those of skill in the art. RB-specific control signal information associated with predetermined RBs transporting the data symbols is generated by RB-specific control processor 220. Common/shared control channel processor 222 is operable to generate control information associating predetermined UEs with one or more designated RBs, as described in more detail herein below. The resource block time-frequency mapper 224 generates a mapping of data symbol, common channel control information and RB-specific control information onto an allocated physical transmission resource.

Those of skill in the art will understand that the data symbols, the common/shared control information and the RB-specific control information are transmitted between the transmitter 202 and an $i^{th}$ receiver over a transmission channel denoted by the channel matrix $H_i$. To simplify the discussion of the various embodiments of the invention, various well-understood processing modules in the receivers 204.$i$ are not shown, but are understood to be included.

Feed-forward channel 226 represents a physical feed-forward channel that transmits shared/common channel information, RB mapping information and RB-specific control information to the receivers 204.$i$. Incoming RBs are processed by a resource block time-frequency demapper 228.$i$ and are stored in a buffer 229.$i$. Common/shared channel information stored in the buffer 229.$i$ is decoded by the shared channel processor 230.$i$ and the resource block control processor 232.$i$. Specifically, the shared channel processor 230.$i$ is operable to decode a plurality of shared channel control elements to locate specific control elements that correspond to a specific UE. The shared channel control element for a specific UE comprises a resource block allocation identifier that designates a specific resource block, or set of resource blocks, that provides a physical resource for transmitting data for that UE. Once the resource block allocation identifier has been decoded, the signal processing/channel estimation processor 234.$i$ is operable to process resource block-specific control information that is decoded by the resource block control processor 232.$i$. Resource block control signal data embedded in one or more predetermined resource blocks is then extracted by the signal processor 234.$i$ and is used to process data received by the receiver 204.$i$ from the transmitter 202.

Figure 3A:
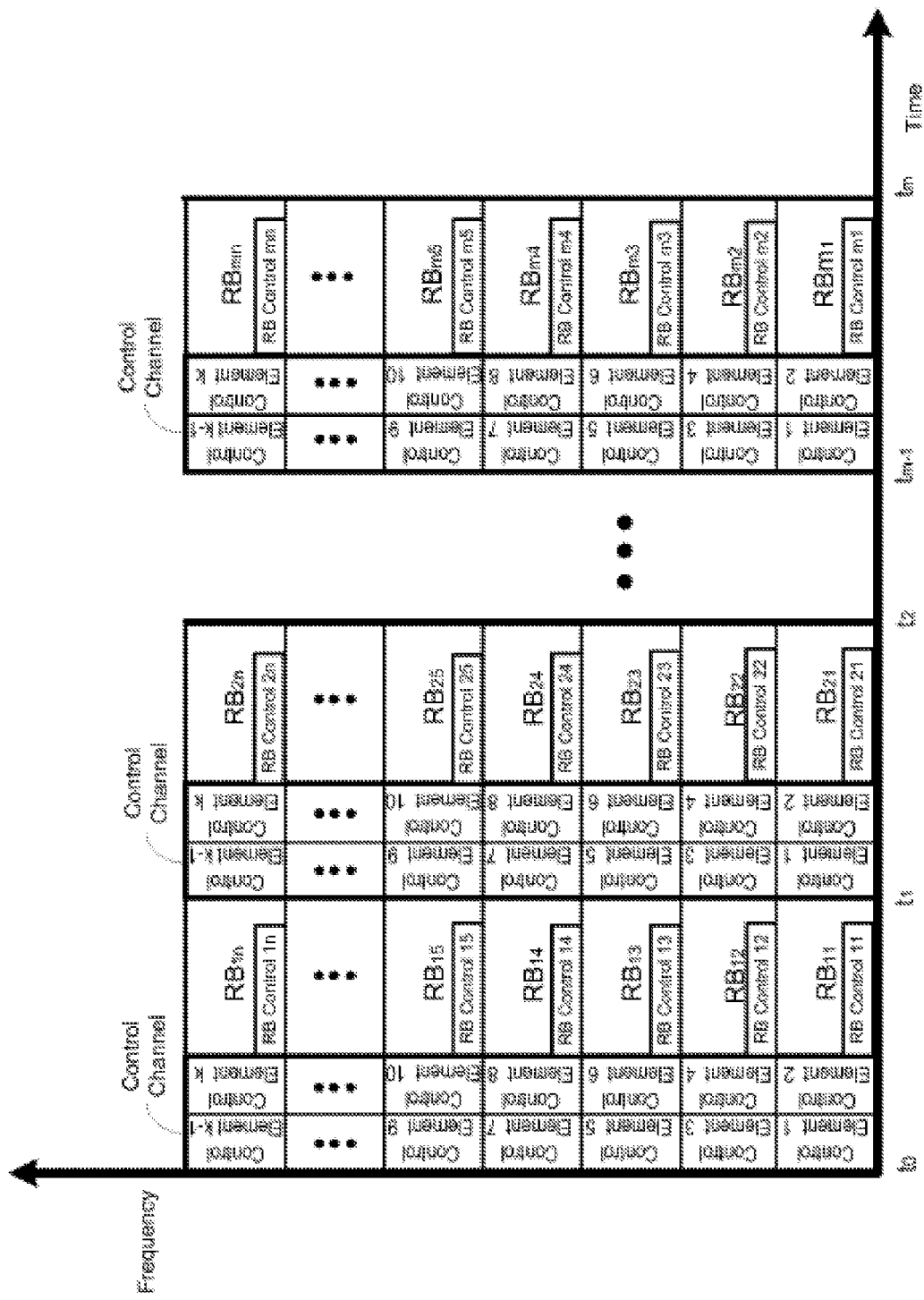
FIG. 3a is an illustration of an allocation of time-frequency resources to a plurality of UEs in a communication system in accordance with the present invention.

FIG. 3a is an illustration of an allocation of time-frequency resources to a plurality of UEs in a communication system in accordance with the present invention. A frequency band comprising a plurality of subcarriers is operable to transmit data for a plurality of UEs over predetermined time intervals $t_0$-$t_m$. As will be understood by those of skill in the art, each of the RBs shown in FIG. 3a represent a time-frequency allocation of transmission resources that may comprise a plurality of subcarriers within a frequency band. The subcarriers may be discontiguous, (i.e., non adjacent to each other). In the embodiment shown in FIG. 3a, control channel elements l-k are transmitted during each of the time intervals $t_0$-$t_m$. In prior art communication systems, the control elements typically comprise a large number of bits, including bits comprising specific control information for predetermined RBs.

As will be understood by those of skill in the art, UEs typically must decode each of the control elements shown in FIG. 3a until they locate a specific control element that includes their UE identifier and a comparatively large number of bits comprising control channel information for the associated resource block. This large number of overhead bits in the control elements severely restricts the number of users that can be served by the communication channel. In an embodiment of the present invention, each of the control elements comprises a UE identifier and an associated resource block allocation identifier. In the embodiment shown in FIG. 3a, predetermined resource blocks $RB_{11}$-$RB_{mn}$ comprise embedded resource block control elements, RB Control$_{11}$-RB Control$_{mn}$ that provide resource block-specific control information. The processing logic discussed above in connection with FIG. 2 is operable to decode the control elements l-k to extract resource block allocation identifier. This resource block allocation identifier is then used to identify the embedded resource block control element, e.g., RB Control$_1$4 in the associated resource block, e.g., $RB_1$4 to that is used by signal processor 234.$i$ to process data received by receiver 204.$i$ from transmitter 202. It will be appreciated by those of skill in the art that multiple UEs can decode the RB-specific control if they are assigned to the corresponding RB. The RB-specific control information included in the resource block control element can comprise virtually any type of control information used in OFDM communication systems. For example the RB-specific control information may include transmission rank information that specifies the number of layers used to transmit the data through a MIMO channel. The RB-specific information also may include layering information specifying how the data streams are mapped onto the layers of a MIMO channel. In addition, or alternatively, the RB-specific information may include preceding matrix index information (PMI). Since the resource block control information is not stored in the common/shared control channel elements, a larger number of users can be serviced using the same amount of bandwidth in the common/shared control channel.

Figure 3B:
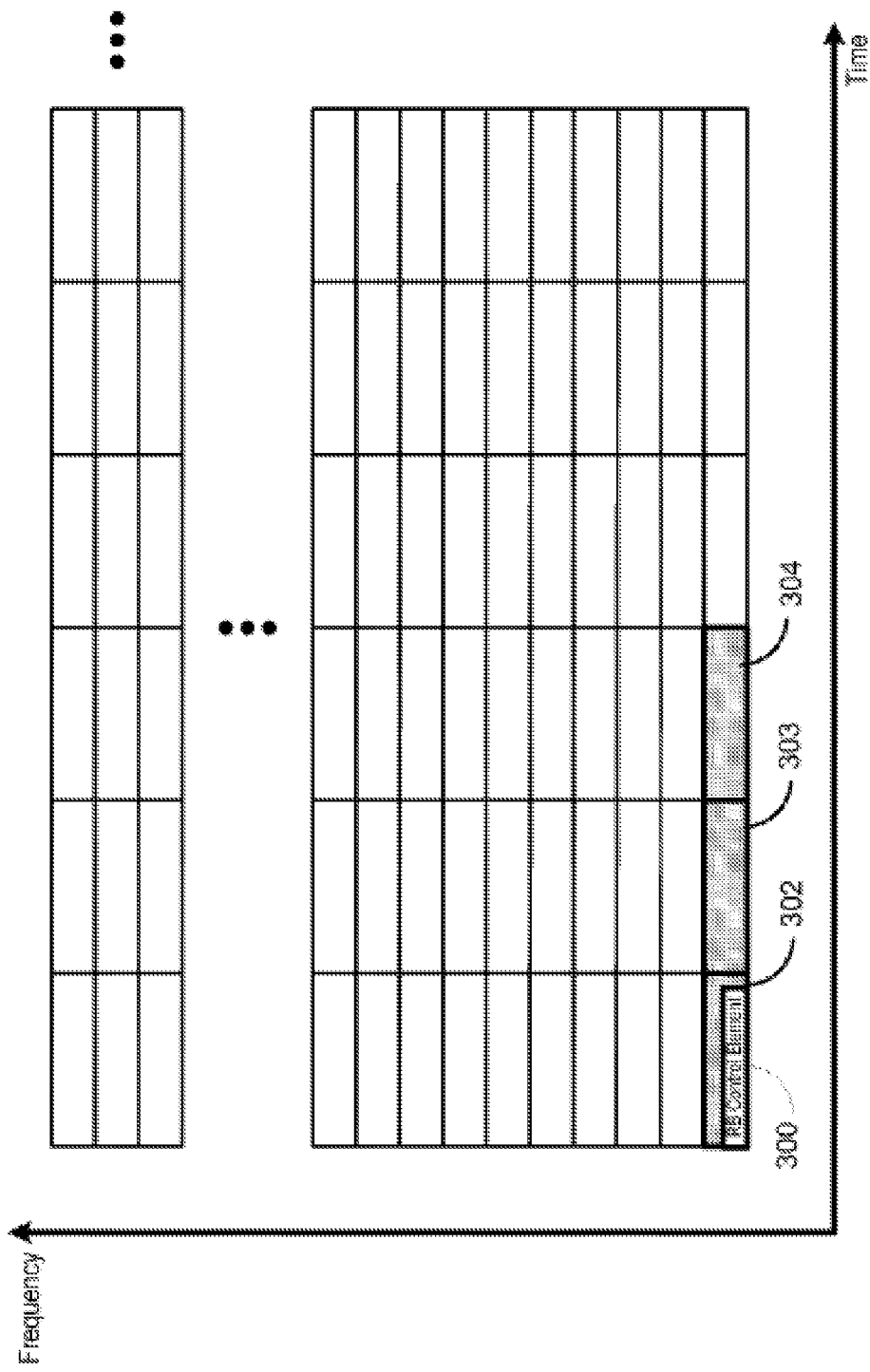
FIG. 3b is an illustration of an embodiment of the invention wherein a single resource control element provides control information for a plurality of resource blocks at a single subcarrier frequency over a plurality of successive time intervals.
Figure 3C:
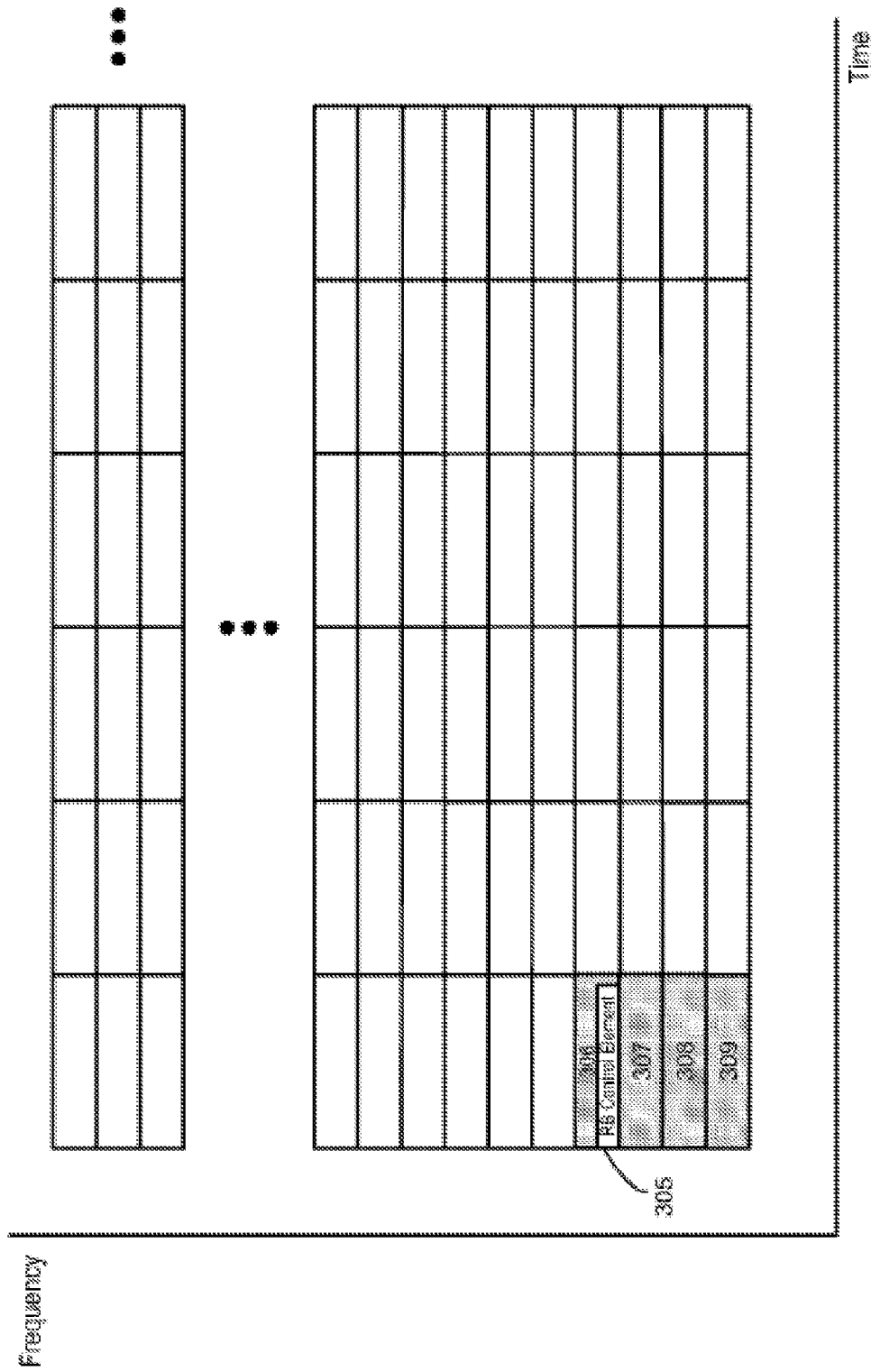
FIG. 3c is an illustration of an embodiment of the invention wherein a single resource control element provides control information for a plurality of resource blocks at multiple subcarrier frequencies over a single time interval.
Figure 3D:
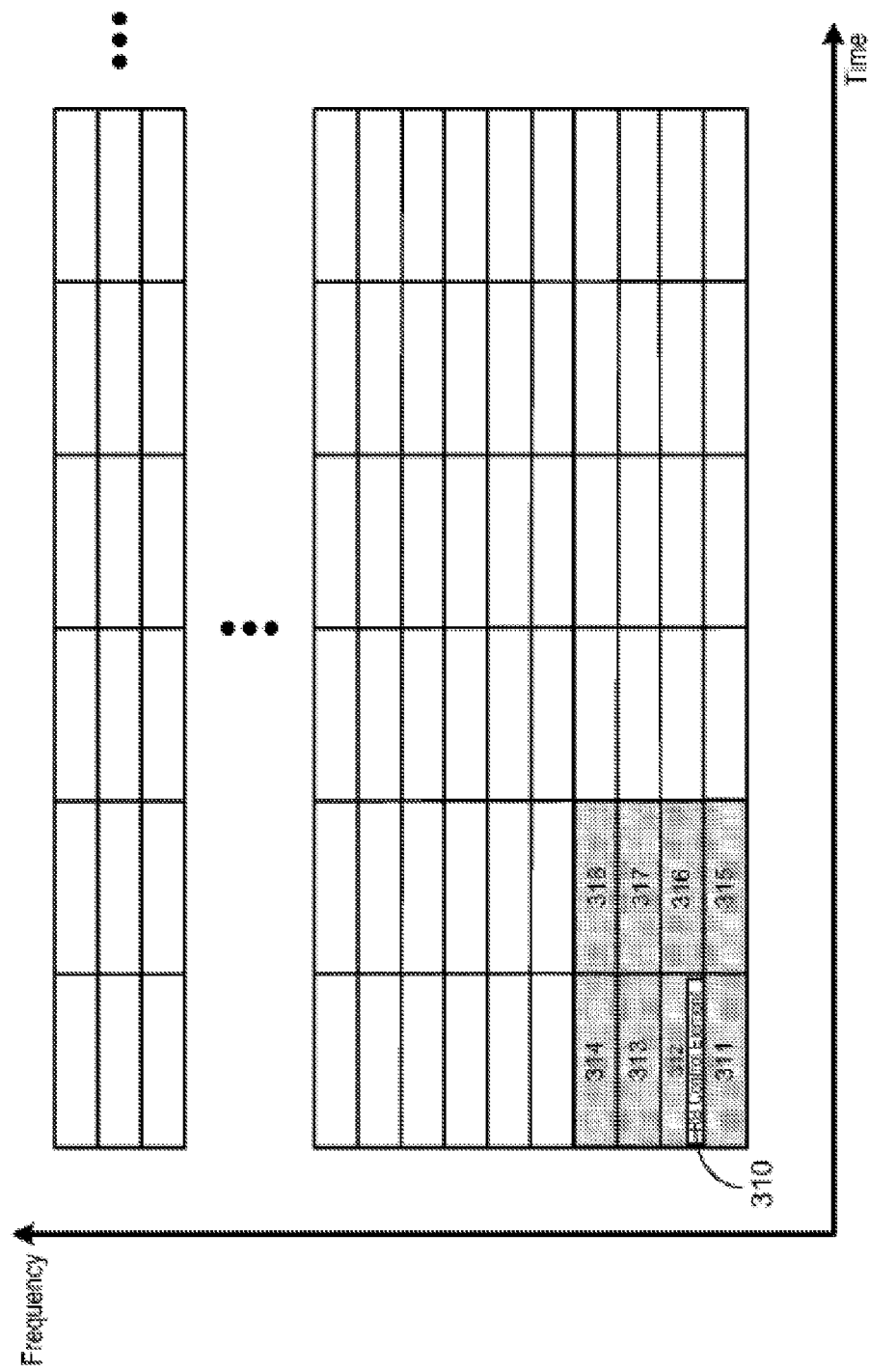
FIG. 3d is an illustration of an embodiment of the invention wherein a single resource control element provides control information for a plurality of resource blocks at a plurality of subcarrier frequencies over a plurality of successive time intervals.

In some embodiments of the invention, a single resource block control element can be used to provide RB-specific control information for a plurality of associated resource blocks to create a set of associated resource blocks, sometimes referred to as a resource block "chunk." For example, as shown in FIG. 3b, a single resource block control element 300 can be used to provide RB-specific control information for RBs 302, 303, and 304 at an RB over three successive time intervals. In the embodiment shown in FIG. 3c, a single resource block control element 305 is used to provide RB-specific control information for RBs 306, 307, 308, and 309 during a single time interval. In the embodiment shown in FIG. 3d, a single resource block control element 310 is used to provide RB-specific control information for RBs 311-318 during multiple time intervals. The association of the individual RBs comprising the resource block chunks can be accomplished using the RB-specific control processor 220 and the common/shared control channel processor 222 shown in FIG. 2.

By now it should be appreciated that there has been provided description of a method and system resource block-specific control signaling in a communication system. In one aspect of the invention, a method for processing signals in a communication system comprises: transmitting data using a plurality of resource blocks within a predetermined frequency band; embedding a resource block control element in individual resource blocks within said plurality of resource blocks, wherein each embedded resource block control element comprises predetermined control information for the resource block in which the resource block control element is embedded; transmitting a plurality of common/shared control channel control elements corresponding to a predetermined set of users, wherein individual control elements comprise a user identifier and an associated resource block allocation identifier; and using said resource block allocation identifier to decode said predetermined control information for said resource block associated with said user.

In another aspect of the invention, a transmitter for use in a wireless communication system comprises: signal processing logic operable to generate a transmission channel comprising a plurality of resource blocks within a predetermined frequency band; a resource block encoder operable to embed a resource block control element in individual resource blocks within said plurality of resource blocks, wherein each embedded resource block control element comprises predetermined control information for the resource block in which the resource block control element is embedded; and a common/shared control channel encoder operable to generate a plurality of common/shared control channel control elements corresponding to a predetermined set of users, wherein individual control elements comprise a user identifier and an associated resource block allocation identifier; wherein said resource block allocation identifier is correlated with said predetermined control information for said resource block associated with said user.

In yet another aspect of the invention, a receiver for use in a wireless communication system, comprises: signal processing logic operable to receive a data transmission signal comprising a plurality of resource blocks within a predetermined frequency band; a resource block control processor operable to extract a resource block control element from individual resource blocks within said plurality of resource blocks, wherein each embedded resource block control element comprises predetermined control information for the resource block in which the resource block control element is embedded; a common/shared control channel processor operable to extract a plurality of common/shared control channel control elements corresponding to a predetermined set of users, wherein individual control elements comprise a user identifier and an associated resource block allocation identifier; and processing logic operable to use said resource block allocation identifier to decode said predetermined control information for said resource block associated with said user.

The methods and systems for providing resource block-specific control signaling in a communication system as shown and described herein may be implemented in hardware or in software stored on a computer-readable medium and executed as a computer program on a general purpose or special purpose computer to perform certain tasks. For a hardware implementation, the elements used to perform various signal processing steps at the transmitter and/or at the receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various communications systems and methods for using same, the present invention is not necessarily limited to the example embodiments illustrate herein. For example, various embodiments of a communication system disclosed herein may be implemented in connection with various proprietary or wireless communication standards, such as IEEE 802.16e, 3GPP-LTE, DVB and other systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
an interface to a wireless transmitter;
one or more processor elements, coupled to the interface, the one or more processor elements configured to:
receive and decode a control channel element corresponding to the apparatus, the control channel element comprising a resource block allocation identifier; and
receive a multiple input multiple output (MIMO) data transmission signal comprising a multiple user MIMO transmission on a plurality of associated resource blocks within a predetermined frequency band;
wherein, in receiving the MIMO data transmission signal, the one or more processor elements are further configured to receive an individual resource block within the plurality of associated resource blocks using the resource block allocation identifier;
wherein the apparatus and at least one other apparatus are configured to receive control information in the individual resource block for the MIMO data transmission signal using the plurality of associated resource blocks, and wherein the control information comprises one or more of: transmission rank information that specifies a number of layers used to transmit data through the MIMO channel, or layering information specifying how data streams are mapped onto layers of the MIMO channel.

2. The apparatus of claim 1, wherein the plurality of associated resource blocks represents time frequency resources comprising a plurality of subcarriers.

3. The apparatus of claim 2, wherein at least some of the plurality of subcarriers are dis-contiguous.

4. The apparatus of claim 1, wherein the apparatus is configured to utilize orthogonal frequency division multiplexing.

5. The apparatus of claim 1, wherein the plurality of associated resource blocks are associated using the control channel element and the control information.

6. The apparatus of claim 1, wherein the individual resource block further comprises control information for multiple other resource blocks during multiple time intervals.

7. The apparatus of claim 1, wherein the control channel element comprises a user identifier.

8. A user equipment, comprising:
an antenna;
a radio coupled to the antenna;
a processor coupled to the radio;
wherein the user equipment is configured to:
receive and decode a control channel element corresponding to the user equipment, the control channel element comprising a resource block allocation identifier; and
receive a multiple input multiple output (MIMO) data transmission signal comprising a multiple user MIMO transmission on a plurality of associated resource blocks within a predetermined frequency band;
wherein, in receiving the MIMO data transmission signal, the user equipment is further configured to receive an individual resource block within the plurality of associated resource blocks using the resource block allocation identifier;
wherein the user equipment and at least one other user equipment are configured to receive control information in the individual resource block for the MIMO data transmission signal using the plurality of associated resource blocks, and wherein the control information comprises one or more of: transmission rank information that specifies a number of layers used to transmit data through the MIMO channel, or layering information specifying how data streams are mapped onto layers of the MIMO channel.

9. The user equipment of claim 8, wherein the plurality of associated resource blocks represents time frequency resources comprising a plurality of subcarriers.

10. The user equipment of claim 9, wherein at least some of the plurality of subcarriers are dis-contiguous.

11. The user equipment of claim 8, wherein the user equipment is configured to utilize orthogonal frequency division multiplexing.

12. The user equipment of claim 8, wherein the of the plurality of associated resource blocks are associated using the control channel element and the control information.

13. The user equipment of claim 12, wherein the individual resource block further comprises control information for multiple other resource blocks during multiple time intervals.

14. The user equipment of claim 8, wherein the control channel element comprises a user identifier.

15. A method for use in a wireless communication system, comprising:
by a user equipment device:
receiving and decoding a control channel element corresponding to the user equipment device, the control channel element comprising a resource block allocation identifier; and
receiving a multiple input multiple output (MIMO) data transmission signal comprising a multiple user MIMO transmission on a plurality of associated resource blocks within a predetermined frequency band;
wherein said receiving the MIMO data transmission signal comprises receiving an individual resource block within the plurality of associated resource blocks using the resource block allocation identifier,
wherein the user equipment device and at least one other user equipment device are configured to receive control information in the individual resource block for the MIMO data transmission signal using the plurality of associated resource blocks, and wherein the control information comprises one or more of: transmission rank information that specifies a number of layers used to transmit data through the MIMO channel, or layering information specifying how data streams are mapped onto layers of the MIMO channel.

16. The method of claim 15, wherein the plurality of associated resource blocks represents time frequency resources comprising a plurality of subcarriers.

17. The method of claim 16, wherein at least some of the plurality of subcarriers are dis-contiguous.

18. The method of claim 15, wherein the user equipment device is configured to utilize orthogonal frequency division multiplexing.

19. The method of claim 15, wherein the plurality of associated resource blocks are associated using the control channel element and the control information.

20. The method of claim 19, wherein the individual resource block further comprises control information for multiple other resource blocks during multiple time intervals.

* * * * *